(12) United States Patent
Hassan et al.

(10) Patent No.: US 11,532,169 B1
(45) Date of Patent: Dec. 20, 2022

(54) DISTRACTED DRIVING DETECTION USING A MULTI-TASK TRAINING PROCESS

(71) Applicant: MOTIVE TECHNOLOGIES, INC., San Francisco, CA (US)

(72) Inventors: Ali Hassan, Lahore (PK); Ijaz Akhter, Lahore (PK); Muhammad Faisal, Jhawarian (PK); Afsheen Rafaqat Ali, Gujranwala (PK); Ahmed Ali, Lahore (PK)

(73) Assignee: MOTIVE TECHNOLOGIES, INC., San Francisco, CA (US)

( * ) Notice: Subject to any disclaimer, the term of this patent is extended or adjusted under 35 U.S.C. 154(b) by 18 days.

(21) Appl. No.: 17/347,682

(22) Filed: Jun. 15, 2021

(51) Int. Cl.
    *G06V 20/59* (2022.01)
    *G06K 9/62* (2022.01)
    *G06V 10/22* (2022.01)
    *G06V 10/94* (2022.01)

(52) U.S. Cl.
    CPC ......... *G06V 20/597* (2022.01); *G06K 9/6257* (2013.01); *G06K 9/6264* (2013.01); *G06V 10/22* (2022.01); *G06V 10/95* (2022.01)

(58) Field of Classification Search
    CPC ...... G06V 20/597; G06V 10/22; G06V 10/95; G06K 9/6257; G06K 9/6264
    See application file for complete search history.

(56) References Cited

U.S. PATENT DOCUMENTS

| | | | |
|---|---|---|---|
| 2017/0357866 A1* | 12/2017 | Welland | B60R 1/00 |
| 2020/0089977 A1* | 3/2020 | Lakshmi Narayanan | G06V 20/597 |
| 2021/0125057 A1* | 4/2021 | Choi | G06N 20/00 |

\* cited by examiner

*Primary Examiner* — Casey L Kretzer
(74) *Attorney, Agent, or Firm* — George David Zalepa; Greenberg Traurig, LLP (57) ABSTRACT

Disclosed are a multi-task training technique and resulting model for detecting distracted driving. In one embodiment, a method is disclosed comprising inputting a plurality of labeled examples into a multi-task network, the multi-task network comprising: a backbone network, the backbone network generating one or more feature vectors corresponding to each of the labeled examples, and a plurality of prediction heads coupled to the backbone network; minimizing a joint loss based on outputs of the plurality of prediction heads, the minimizing the joint loss causing a change in parameters of the backbone network; and storing a distraction classification model after minimizing the joint loss, the distraction classification model comprising the parameters of the backbone network and parameters of at least one of the prediction heads.

20 Claims, 9 Drawing Sheets

DISTRACTED DRIVING DETECTION USING A MULTI-TASK TRAINING PROCESS

BACKGROUND

The disclosed embodiments are directed towards driver distraction detection and, in particular, to improve machine learning (ML) modeling of driver distraction. Currently, many systems for automatic driver distraction detection utilize a transfer learning approach wherein well-known, public training data sets are used to train ML models. Such systems, however, suffer from poor prediction performance when applied to real-world images and/or video.

BRIEF SUMMARY

Driver distraction detection is an important task for accident prevention as well as fleet management. Currently, driver distraction is one of the major causes of road fatalities, especially involving heavy-duty vehicles. Smart artificial (AI) dashcam solutions to alert or prevent distraction can make a huge impact in terms of accident avoidance. Automatic driver-distraction detection can also be used for driver training and fleet management.

Existing solutions for driver distraction detection use transfer learning approaches where deep neural networks (DNNs) are trained and tested on small datasets captured in a controlled environment. Such an approach does not work on more challenging (e.g., real-world) datasets as the DNN is unable to learn which parts of the image are important in predicting a distraction tag.

The disclosed embodiments, by contrast, detect distracted driving by utilizing a multi-task model, which comprises distraction classification and simultaneous detection of a mobile, the driver's face, their body, and upper-body landmarks. In brief, the disclosed embodiments utilize a unified network and a plurality of downstream prediction heads for each of these tasks (e.g., mobile detection, face detection, etc.). The disclosed embodiments then train the unified network by minimizing a joint loss across the prediction heads.

By utilizing a multi-task model during training, the network can better learn and predict accurate distraction tags. The disclosed network is also very efficient and is easily extendable to other distraction classes such as eating, drinking, smoking, etc. Indeed, the disclosed embodiments can be extended to the most common distraction classes such as cell phone usage (e.g., talking, texting, other usages), smoking, talking to fellow passengers, talking on a handsfree headset, taking both hands off the wheel, eating/drinking, reading or writing, one-handed driving while the other hand is doing a secondary action. The list of distraction classes can grow or shrink based on the severity of each distraction as decided by the relevant fleets.

The disclosed embodiments additionally allow for the prediction of multiple tags per image. For example, the model can jointly predict seat-belt violation and multiple distraction tags such as mobile usage, "other" distractions, and undistracted for the same image.

The disclosed embodiments are significantly more accurate than existing solutions. This accuracy can be critical in some applications as it prevents false alarms and reduces driver/operator annoyance. Further, frequent false positives can reduce confidence in the detections. Further, the disclosed embodiments are capable of being run on edge devices (e.g., on-dash devices) and do not require a centralized model.

In contrast, existing systems mainly focus on head pose-based driver distraction, and their detection of distraction (e.g., mobile-phone usage) and non-distraction-related tags (e.g., seat-belt violation) are unreliable at best.

DETAILED DESCRIPTION

The disclosed embodiments describe a multi-task modeling technique for detecting distracted driving. In one embodiment, the disclosed embodiments can be implemented as methods, devices, and non-transitory computer-readable storage media for tangibly storing computer program instructions capable of being executed by a computer processor.

The disclosed embodiments include inputting a plurality of labeled examples into a multi-task network, comprising a backbone network coupled with a plurality of prediction heads. The backbone network generates one or more feature vectors corresponding to each of the labeled examples, and the attached heads solve the required tasks. The disclosed embodiments then minimize a joint loss based on outputs of the plurality of prediction heads, causing a change in the parameters of the backbone network. Finally, after minimizing the joint loss, the disclosed embodiments store a distraction classification model, comprising the parameters of the backbone network and the parameters of at least one of the prediction heads.

In one embodiment, the backbone network comprises a convolutional neural network (CNN) (e.g., an EfficientNet) and a feature pyramid network (FPN) (e.g., a bi-directional FPN) coupled to the CNN. In one embodiment, a subset of the plurality of prediction heads receives input from the CNN, and a second subset of the plurality of prediction heads receives input from the FPN.

In one embodiment, a subset of the plurality of prediction heads comprises a distraction classification prediction head, which comprises a convolutional layer, pooling layer, and fully connected layer.

In one embodiment, the second subset of the plurality of prediction heads includes one or more of an object detection prediction head and a pose estimation prediction head. In one embodiment, the object detection prediction head comprises a bounding box regression network, and an object class prediction network. Each of the bounding box regression network and the object class prediction network comprise deep neural networks having a plurality of hidden layers such as a convolutional layer, a batch normalization layer, and an activation layer. The bounding box regression network outputs coordinates of a bounding box enclosing a detected object and the object class prediction network outputs a class corresponding to the detected object. In one embodiment, the pose estimation prediction head comprises a deep neural network, comprising a plurality of hidden layers and an output layer. The hidden layers comprise a convolutional layer, a batch normalization layer, and an activation layer, and the output layer comprises a convolutional layer.

In one embodiment, storing a distraction classification model after minimizing the joint loss comprises storing parameters of the CNN and at least one of the prediction heads.

Figure 1:
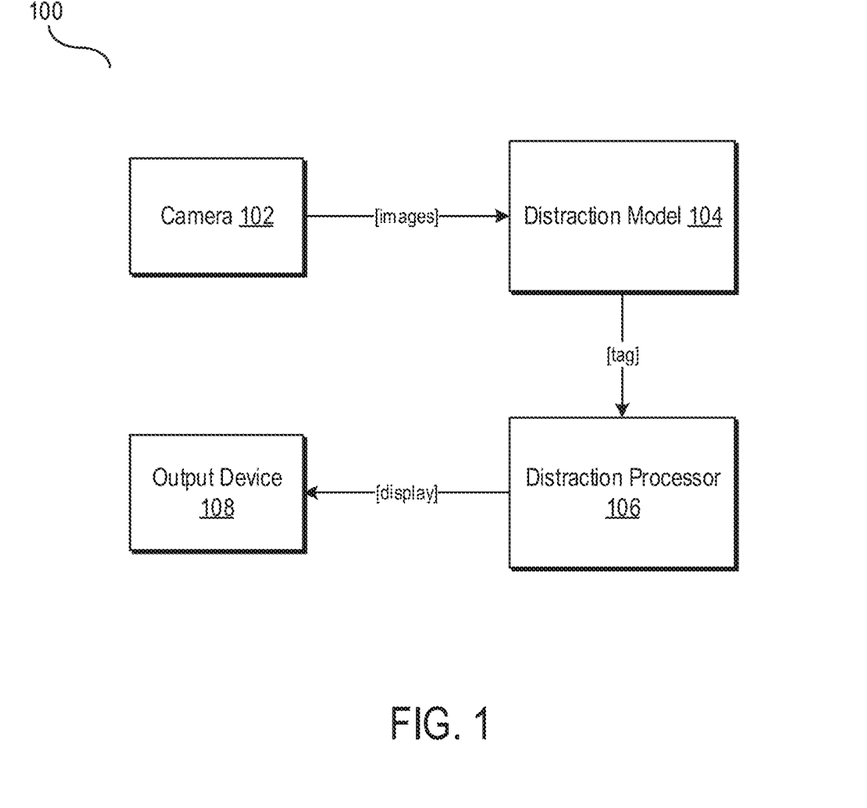
FIG. 1 is a block diagram illustrating a system for distracted driver detection according to some embodiments.

FIG. 1 is a block diagram illustrating a system 100 for distracted driver detection according to some embodiments. In an embodiment, system 100 includes a camera 102, a distraction model 104, a distraction processor 106, and an output device 108.

In an embodiment, camera 102 can comprise a still or video camera. In an embodiment, camera 102 can comprise a dash-mounted camera device installed within a vehicle. In an embodiment, camera 102 can comprise a digital or electronic camera device. In some embodiments, camera 102 can be integrated into a single device that includes a distraction model 104, a distraction processor 106, and an output device 108. In other embodiments, camera 102 can comprise a standalone camera communicatively coupled to distraction model 104.

In an embodiment, camera 102 transmits images to distraction model 104. In an embodiment, images can comprise still images captured by camera 102. In an embodiment, the still images can comprise frames of a captured video. In some embodiments, camera 102 can perform pre-processing on the images before transmitting images to the distraction model 104. For example, camera 102 can crop, down-sample, perform a grayscale conversion, or perform other image processing techniques on the images prior to transmitting them to the distraction model 104.

Figure 5:
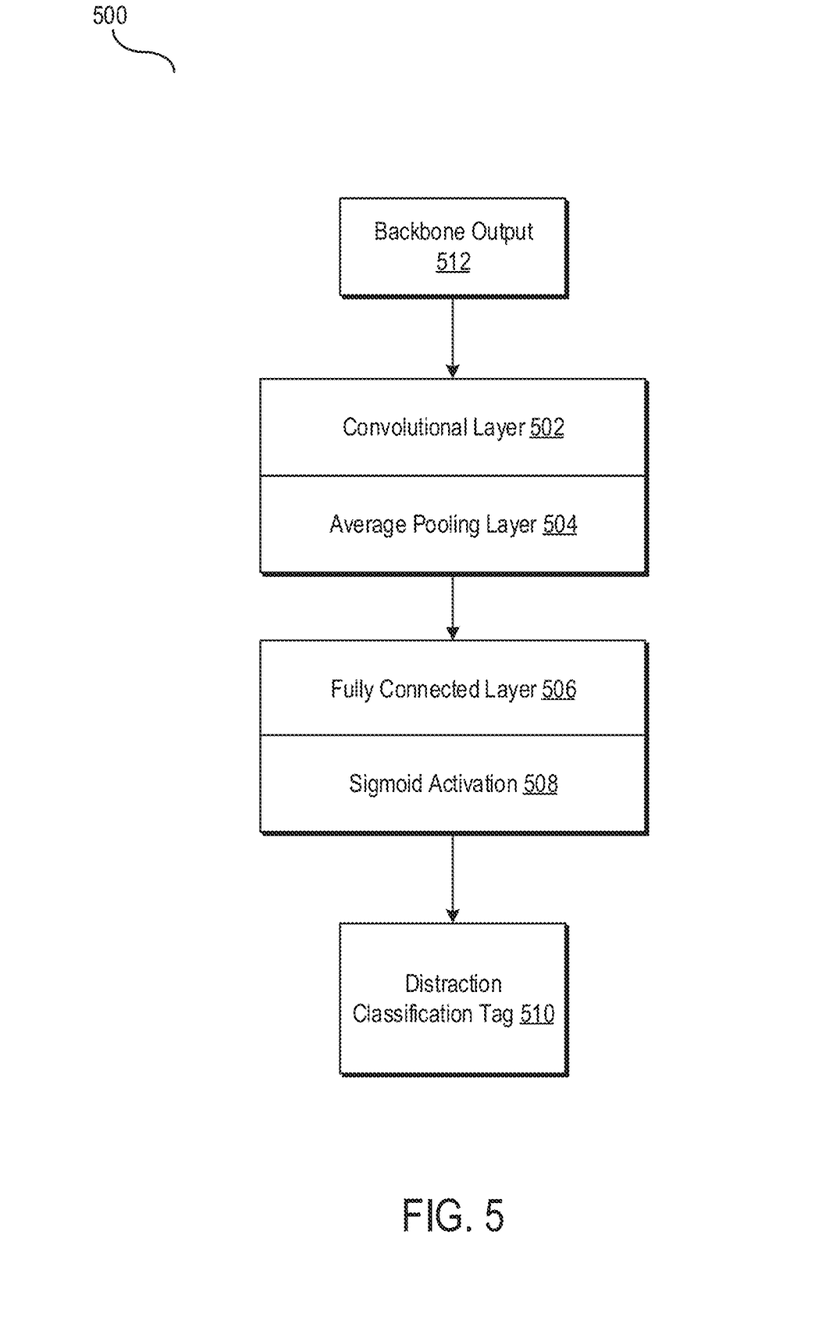
FIG. 5 is a block diagram of a distraction classification prediction head according to some embodiments.

In an embodiment, distraction model 104 comprises a machine learning (ML) model configured to receive image inputs and generates a distraction classification tag. In an embodiment, distraction model 104 comprises a backbone network and a distraction classification prediction head (FIG. 5). In brief, distraction model 104 comprises a backbone network that can comprise a convolutional neural network (CNN), such as EfficientNet, which generates a plurality of features (e.g., a feature vector or tensor). In an embodiment, the outputs of the CNN are fed to a prediction head that predicts distraction classifications or labels based on the images.

In an embodiment, the outputs of the distraction model 104 are then fed to a distraction processor 106. In an embodiment, distraction model 104 and distraction processor 106 can be tightly coupled as a single hardware and/or software implementation. In other embodiments, distraction model 104 and distraction processor 106 can be loosely coupled or completely uncoupled (e.g., run in a client-server architecture). In an embodiment, distraction processor 106 can comprise business logic to determine what to display on output device 108 based on the incoming tags. The distraction processor 106 receives a tag from the distraction model 104. In response, distraction processor 106 can be configured with rules or other conditions that define an action to take based on the tag. For example, the distraction processor 106 can be configured to transmit a message to a remote server when the tag output by the distraction model 104 indicates that a distraction is present. Alternatively, or in conjunction, distraction processor 106 can generate a display or alert and transmit this display or alert to the output device 108. In an embodiment, output device 108 can comprise a heads-up display, monitor, speaker, or any other audio/visual display device installed in the vehicle.

Figure 2:
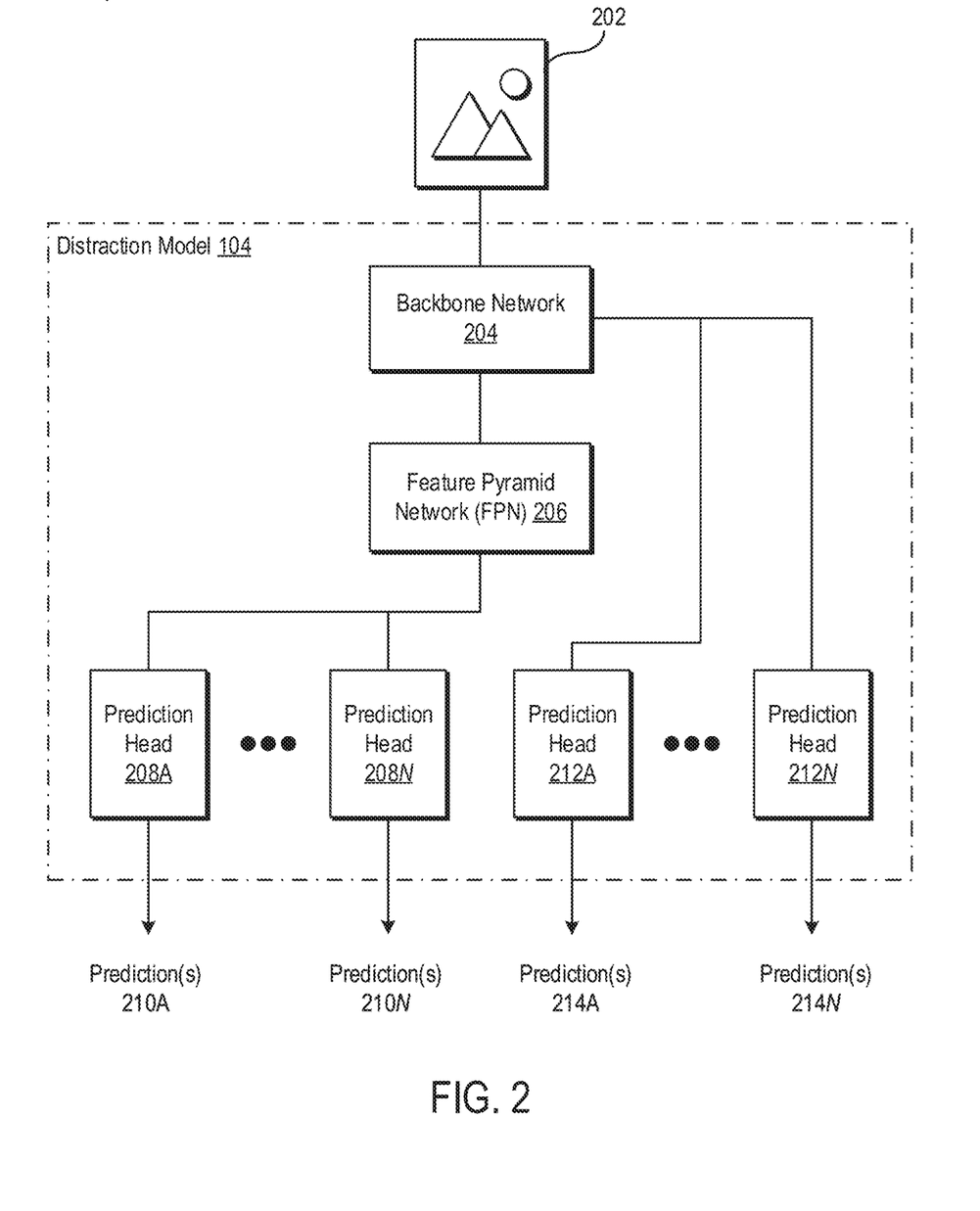
FIG. 2 is a block diagram of a distraction network according to some embodiments.

In an embodiment, the distraction model 104 can comprise a single prediction head. However, as will be discussed in more detail in FIG. 2, the distraction model can utilize multiple other heads during training, and minimize a joint loss among the heads. Thus, in some embodiments, multiple heads can be used to improve the training of the backbone network and classification head. Once trained, the unneeded heads can be discarded FIG. 2 is a block diagram of the distraction network 200 according to some embodiments. In the embodiment, network 200 includes a plurality of prediction heads 208a-208n and 212a-212n. As will be discussed, the prediction heads 208a-208n, 212a-212n may only be present during training and some of the prediction heads 208a-208n, 212a-212n can be removed before deploying the model to an edge-device. As will be discussed, the use of a full set of heads prediction heads 208a-208n, 212a-212n during training can assist in improving the classification accuracy of the network 200.

In alternative embodiments, network 200 receives an image 202 as an input. As discussed above, image 202 can be obtained from a digital or video camera installed in a vehicle (e.g., a dash-mounted camera). In alternative embodiments, each image can be represented as a tuple of the image height, width, and depth. For example, a 128×128 RGB image has a height and width of 128 pixels and a depth of three for each color (red, green, blue). Similarly, a 1024×1024 grayscale image has a height and width of 1024 pixels with a depth of one (black). Generally, the network is trained in the form of batches of images and the number of images inside a batch is called batch-size. Thus, in some embodiments, the input shape into the CNN can be represented as (b, h, w, d), where b represents the batch size, h and w represent the height and width of each image, and d represents the color depth of each image. Thus, although a single image 202 is illustrated, in some embodiments, multiple images can be input into the network 200 as part of a batch.

In alternative embodiments, the network 200 performs an initial processing on the image 202 using a backbone network 204. In one embodiment, backbone network 204 comprises a deep neural network. In some embodiments, backbone network 204 comprises a CNN. In an embodiment, backbone network 204 comprises a scalable CNN, scaled using a compound coefficient. In general, backbone network 204 can comprise any CNN wherein the CNN is scaled by uniformly scaling depth of the network (i.e., the number of layers), the width of each layer, and the resolution (e.g., image height and width) of the input images. In one embodiment, backbone network 204 comprises an EfficientNet model. In one embodiment, backbone network 204 comprises an EfficientNet-B0 network or EfficientNet-lite0 network. In an embodiment, a lightweight network (e.g., EfficientNet-lite0) can be used to support edge prediction, while a heavier model (e.g., EfficientNet-B0) can be used if the model is run on a centralized computing device. Although the foregoing description emphasizes the use of CNNs scaled with uniform compound coefficients (e.g., EfficientNet variants), other networks can be used. For example, the backbone network 204 can comprise a ResNet, VGG16, DenseNet, Inception, Xception, PolyNet, SESNet, NASNet, AmoebaNet, PNASNet, GPipe, or another similar image classification deep neural network.

As illustrated, backbone network 204 can output a feature vector to a feature pyramid network (FPN) 206. In some embodiments, the FPN comprises a bidirectional FPN (BFPN). In brief, the FPN 206 receives a plurality of detected features from the backbone network 204 and repeatedly applies top-down and bottom-up bidirectional feature fusion. The fused features generated by FPN 206 can then be supplied to one or more downstream prediction heads 208a-208n for prediction or classification. For example, the FPN can detect various objects (e.g., body parts, mobile phones, etc.) of interest at different resolutions of the given image.

In some embodiments, the FPN 206 may only receive a subset of the features of the backbone network 204. For example, the backbone network 204 may include n of hidden layers, and the FPN 206 may receive the outputs (i.e., features) of m of these hidden layers, where m<n.

In the illustrated embodiment, the distraction model 104 includes a plurality of prediction heads 208a-208n and 212a-212n. As illustrated, some of the prediction heads (e.g., 208a-208n) receive features generated by the FPN 206 as inputs while other prediction heads (212a-212n) receive features generated by the backbone network 204. As one example, an object detection head (discussed in connection with FIG. 3) and a pose estimation head (discussed in connection with FIG. 4) can receive features from the FPN 206, while a distraction classification head (discussed in connection with FIG. 5) can receive features generated by the backbone network 204.

During the training of network 200, all prediction heads 208a-208n, 212a-212n are connected to the backbone network 204 or FPN 206. During training, a joint loss can be minimized while all prediction heads are used to generate predictions 210a-210n, 214a-214n. That is, network 200 can be trained by optimizing a joint loss for each of the prediction heads 208a-208n, 212a-212n. Since each of the prediction heads 208a-208n, 212a-212n can be tuned to detect specific features of an image, the joint loss ensures that the backbone network 204 and individual prediction heads 208a-208n, 212a-212n are trained to emphasize critical regions of images useful for distraction classification. The following example provides further detail of this classification.

In an embodiment, the joint loss minimized during training can be represented as:

$$loss = loss_{detection} + loss_{bbox} + loss_{classification} + loss_{landmarks} + loss_{reg}$$

where, $loss_{detection}$ is the object detection Huber loss for an object detection head, $loss_{bbox}$ is the bounding box detection focal loss for the object detection head, $loss_{classification}$ is a binary cross-entropy loss for a distraction classification head, $loss_{landmarks}$ is a classification loss for the pose detection head expressed as softmax based cross-entropy, and $loss_{reg}$ is an $L_2$ regularization loss.

By minimizing the joint loss, the disclosed embodiments are able to train all prediction heads at the same time. In some embodiments, additional prediction heads can be added to further improve the accuracy of the distraction classification by learning good features capable of solving all tasks performed by the prediction heads. In these embodiments, the use of multiple heads and minimizing the joint loss forces model 104 to focus on the part of the image that should be considered in deciding a distraction tag of an image. In particular, the disclosed embodiments force model 104 to focus on a driver's face, the body, the upper-body landmarks, and mobile, if detected, to decide what the driver is doing and what tag should be assigned to the image.

Once model 104 is trained, the features have been learned in the backbone network 204 that explicitly focus on the parts of the image that are important in predicting the distraction tag. In some embodiments, during testing or production, however, there is no need to compute the response of object detection and upper-body pose head. Thus, these prediction heads can be simply removed, and the extra computations can be avoided. That is, in some embodiments, all prediction heads 208a-208n, 212a-212n can be used for training while less than all (e.g., one) prediction head can be used during testing or production usage, thus reducing the overall size of the testing/production models.

Figure 3:
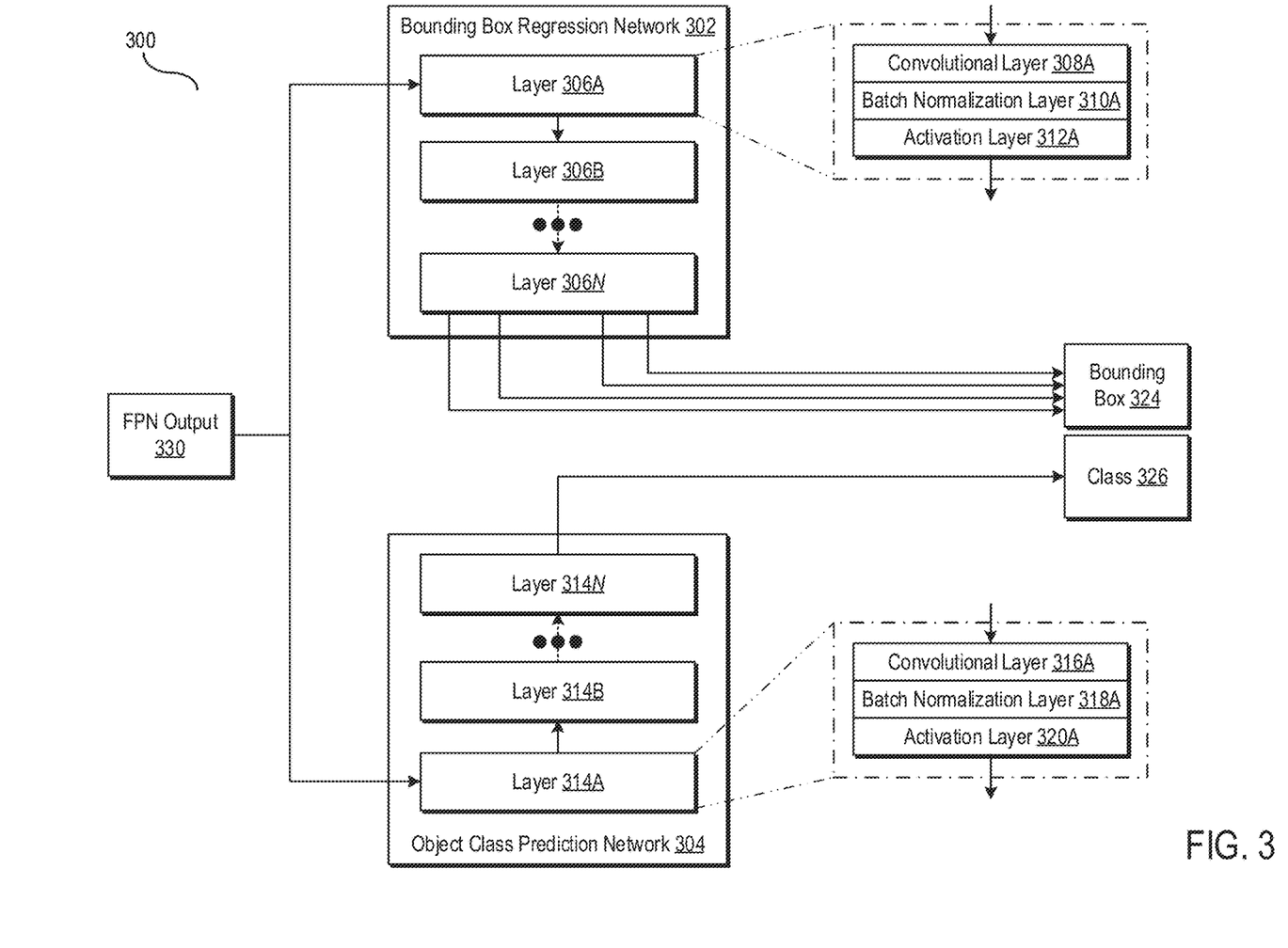
FIG. 3 is a block diagram of an object detection prediction head according to some embodiments.

FIG. 3 is a block diagram of an object detection prediction head 300 according to some embodiments.

In an embodiment, object detection head 300 comprises two networks: a bounding box regression network 302 and an object class prediction network 304. In an embodiment, both networks 302, 304 receive feature vector inputs from an FPN or similar feature detector.

In an embodiment, the output of the FPN comprises a set of higher-level features detected via the CNN and FPN. These higher-level features are input into the first layers 306a, 314a, of both bounding box regression network 302 and an object class prediction network 304. As illustrated, the bounding box regression network 302 and an object class prediction network 304 operate on the same feature vector in parallel. As illustrated, each layer (306a, 306b, 306n, 314a, 314b, 314n) comprises multiple sub-layers. In one embodiment, each layer (306a, 306b, 306n, 314a, 314b, 314n) comprises a convolutional layer (e.g., 308a, 316a). In an embodiment, a given convolutional layer (e.g., 308a, 316a) performs a convolution on the features from the FPN (or, in later layers such as 306b and 314b, on the output of the previous layer) using a fixed kernel or filter.

The outputs of the convolutional layers (e.g., 308a, 316a) can then be input into a batch normalization layer (e.g., 310a, 318a). In an embodiment, a batch normalization layer scales the output of the convolutional layers (e.g., 308a, 316a) by standardizing the activations of each input variable per mini-batch, such as the activations of a node from the previous layer. In an embodiment, the batch normalization layer (e.g., 310a, 318a) can standardize the mean and variance of each unit in order to stabilize learning but allows the relationships between units and the nonlinear statistics of a single unit to change.

The outputs of the batch normalization layer (e.g., 310a, 318a) are then input to an activation layer (e.g., 312a, 320a). In an embodiment, the activation layers (e.g., 312a, 320a) comprise functional layers that define the output of the layer as a function of the input (e.g., from batch normalization layers such as 310a, 318a). Various activation functions can be used to implement activation layers (e.g., 312a, 320a) including, but not limited to, linear, rectified linear unit (ReLu), Scaled Exponential Linear Unit (SeLu), Exponential Linear Unit (ELU), sigmoid, Maxout, softmax, or similar activation functions.

In an embodiment, both the bounding box regression network 302 and an object class prediction network 304 can include multiple layers (306a, 306b, 306n, 314a, 314b, 314n), and the specific number of layers is not limited.

Figure 4:
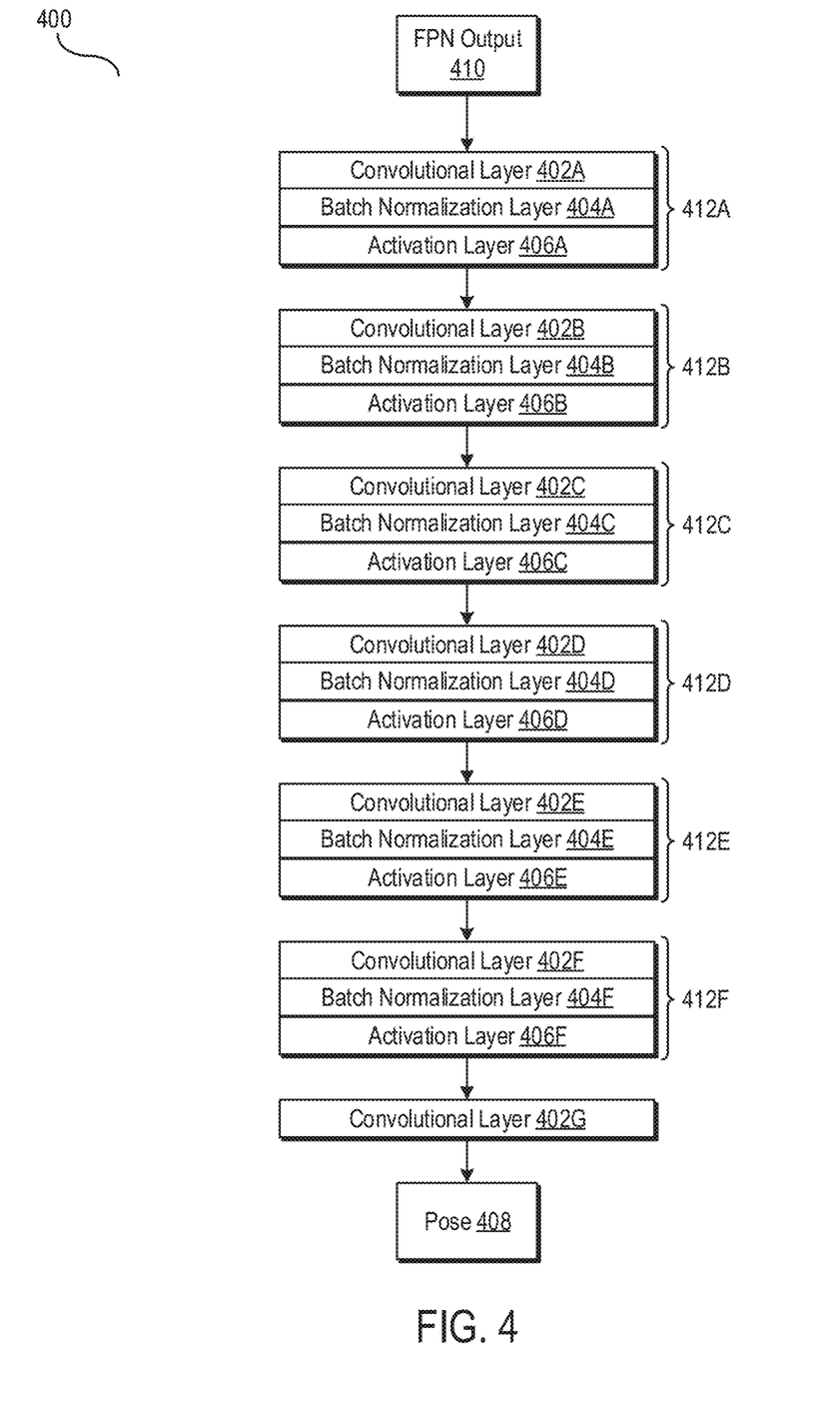
FIG. 4 is a block diagram of a pose estimation prediction head according to some embodiments.

FIG. 4 is a block diagram of a pose estimation prediction head 400 according to some embodiments.

In one embodiment, the pose estimation prediction head 400 comprises a deep learning network. In one embodiment, the pose estimation prediction head 400 comprises a deep convolutional neural network. In one embodiment, the pose estimation prediction head 400 comprises a plurality of layers (412a-412f, 402g). In alternative embodiments, the pose estimation prediction head 400 includes seven convolutional layers (402a-402g). In alternative embodiments, each layer, except the final layer 402g, can comprise a plurality of sub-layers (402a-402f, 404a-404f, 406a-406f). In alternative embodiments, the sub-layers are substantially similar across layers and may vary primarily in the convolutional layer dimensions (e.g., filter shape, padding strategy, stride, etc.).

In alternative embodiments, each of the layers (412a-412f) includes an initial convolutional layer (e.g., 402a-402f). In alternative embodiments, a first layer (412a) inputs the output of the FPN into the first convolutional layer (402a). The first convolutional layer (402a) uses a first layer filter to convolve the input features into a convolutional output. The specific values of the filter are learned via back-propagation of a joint loss, as described elsewhere. The convolved output is then inputted into a batch normalization layer (404a). In an embodiment, a batch normalization layer scales the output of the convolutional layer (402a) by standardizing the activations of each input variable per mini-batch, such as the activations of a node from the previous layer. In an embodiment, the batch normalization layer (404a) can standardize the mean and variance of each unit in order to stabilize learning but allows the relationships between units and the nonlinear statistics of a single unit to change. The output of the batch normalization layer (404a) is then inputted to an activation layer (406a). In an embodiment, the activation layer (406a) comprises a functional layer that defines the output of the batch normalization layer (404a) as a function of the input. Various activation functions can be used to implement the activation layer (406a), including, but not limited to, linear, rectified linear unit (ReLu), Scaled Exponential Linear Unit (SeLu), Exponential Linear Unit (ELU), sigmoid, Maxout, softmax, or similar activation functions.

As a result of the foregoing process, a first layer (412a) outputs a convolved, normalized, and activated output. The first layer (412a) passes this output to a second layer (412b) which performs the same process, and the process progresses through each of the first partially connected layers (412a-412f).

In some embodiments, the layers (412a-412f) may include additional sub-layers not illustrated. For instance, each layer (or some layers) can include a max-pooling or average pooling layer to eliminate portions of the convolution that do not yield relevant features. In some embodiments, each layer (or some layers) can also include a dropout layer that removes unactivated neurons to prevent overfitting. In some embodiments, each layer can include multiple convolutional layers.

The output (e.g., feature matrix) of the final partially connected layer (412f) is then passed to a single convolutional layer 412g. The final convolutional layer 412g performs a convolution with a filter as described above and outputs a final convoluted output. In alternative embodiments, the final convoluted output comprises a pose vector 408. The pose vector 408 represents pose estimations of the input FPN features. For example, the backbone network and FPN may identify a plurality of body part features (e.g., forearms, biceps, torso, etc.). These features are input into the pose estimation prediction head 400, which can determine pose parameters (e.g., X and Y, 2D coordinates of the body landmarks) for each feature identified by the backbone network and FPN.

FIG. 5 is a block diagram of a distraction classification prediction head 500 according to some embodiments.

In one embodiment, the distraction classification prediction head 500 receives as an input the output 512 of the backbone network. In contrast to heads 300 and 400, the distraction classification prediction head 500 receives inputs directly from the backbone network and not the FPN. As will be discussed, in some embodiments, the backbone network and the distraction classification prediction head 500 may be stored as the final distraction classification model; thus the distraction classification prediction head 500 receives input directly from the backbone network to enable training of the distraction classification prediction head 500.

The distraction classification prediction head 500 passes the backbone output 512 to a convolutional layer 502. The convolutional layer (502) uses a filter to convolve the input features into a convolutional output. The specific values of the filter are learned via back-propagation of a joint loss, as described elsewhere. The convolved output of the convolutional layer 502 is input into an average pooling layer 504. The average pooling layer 504 segments the convolved output into a plurality of blocks, each block containing a plurality of outputs. The average pooling layer 504 then computes the average of the outputs within a given block and outputs an averaged convolution. Notably, since the average pooling layer 504 operates on blocks of a convolved input, the resulting output is necessarily reduced in dimensionality. Further, the use of an average pooling layer 504 ensures that the locality of features is preserved when convolving an input feature matrix.

The output of the average pooling layer 504 is then passed to a fully connected layer 506, also referred to as a dense network or feed-forward neural network. In the illustrated embodiment, the input shape of the fully connected layer 506 matches the output shape of the average pooling layer 504. In the fully connected layer 506, each neuron is connected to every other neuron in layer 506. Thus, in one embodiment, the feature matrix output by the average pooling layer 504 is converted (i.e., flattened) to a feature vector and used as the input to the fully connected layer 506. Each neuron of the fully connected layer 506 receives all values of the feature vector and is also connected to each input neuron of the next layer. In some embodiment, the next layer comprises a second layer of neurons. In some embodiments, the fully connected layer 506 can comprise multiple layers of neurons. Ultimately, a final layer of hidden neurons is connected to the sigmoid activation layer 508. In the illustrated embodiment, each layer of the fully connected layer 506 has a size (i.e., number of neurons) and corresponding weight vector learned during training.

In the illustrated embodiment, the output vector of the fully connected layer 506 is received by the sigmoid activation layer 508. In one embodiment, the sigmoid activation layer 508 comprises neurons equal to the size of the desired output. Each neuron in the sigmoid activation layer 508 receives the outputs of all neurons of the final layer of the fully connected layer 506. In one embodiment, the number of neurons in the sigmoid activation layer 508 corresponds to the number of classification tags desired. In one embodiment, the neurons of the sigmoid activation layer 508 perform a sigmoid operation on the inputs to generate a value between 0 and 1.

As illustrated, the resulting output of the sigmoid activation layer 508 comprises a distraction classification tag 510. In one embodiment, the classification tag 510 can comprise a vector of values (between 0 and 1), where each value represents the probability of a given tag being applicable to the input image.

As discussed above, heads 300, 400, and 500 can all be connected to the backbone network and FPN during training. In this arrangement, back-propagation is used to perform a gradient descent operation to minimize a loss function. This back-propagation results in changes to the weights and other model parameters to minimize such a loss function. Since the model, during training, includes multiple heads, there are multiple loss functions for each head and, in some instances, multiple loss functions for a single head, such as the object detection prediction head. Thus, as will next be described, a joint loss function is used to perform back-propagation. Since a joint loss function is used, the entire network is optimized based on the outputs of all prediction heads, which forces the network to focus on the features detected by the prediction heads. By contrast, existing systems rely primarily on image classification, which is unable to consider features such as pose estimation and object detection and instead relies exclusively on labeled image data to train a classifier. As a result, such systems are relatively inaccurate, since the model does not fundamentally understand which regions of an image are of interest for the problem of distraction classification.

A discussed previously, good features for driver distraction are not trivial to automatically learn by transfer-learning. By using the disclosed architecture of a network 200, good features for distraction classification can be learned by re-posing the learning objective as a multi-task problem, where solving those tasks should help solve the original problem of distraction classification. Thus, as discussed above, the disclosed embodiments can use face detection, person detection, mobile detection, upper-body pose estimation, etc., to improve the overall learning objective. For example, person detection can help the overall network 200 locate a driver; face detection can help in detecting where the driver is looking; mobile detection can help in classifying the distraction as mobile usage; and upper-body pose estimation can help distinguish between undistracted and distracted classes (e.g., body-pose during normal driving should be different than the one when the driver is using a mobile or eating or drinking). The disclosed embodiments utilize a unified network (backbone and FPN) with separate prediction heads corresponding to each of these tasks. As will be discussed next, network 200 can be trained by minimizing a joint loss among the prediction heads. Additional heads for other related problems such as facial landmarks detection, human-body segmentation can be added to the system and to the joint loss function to improve or adjust performance. Similarly, additional objects such as food and drink items, and cigarettes and cigars can also be included in the object detection framework to the same effect.

Figure 6:
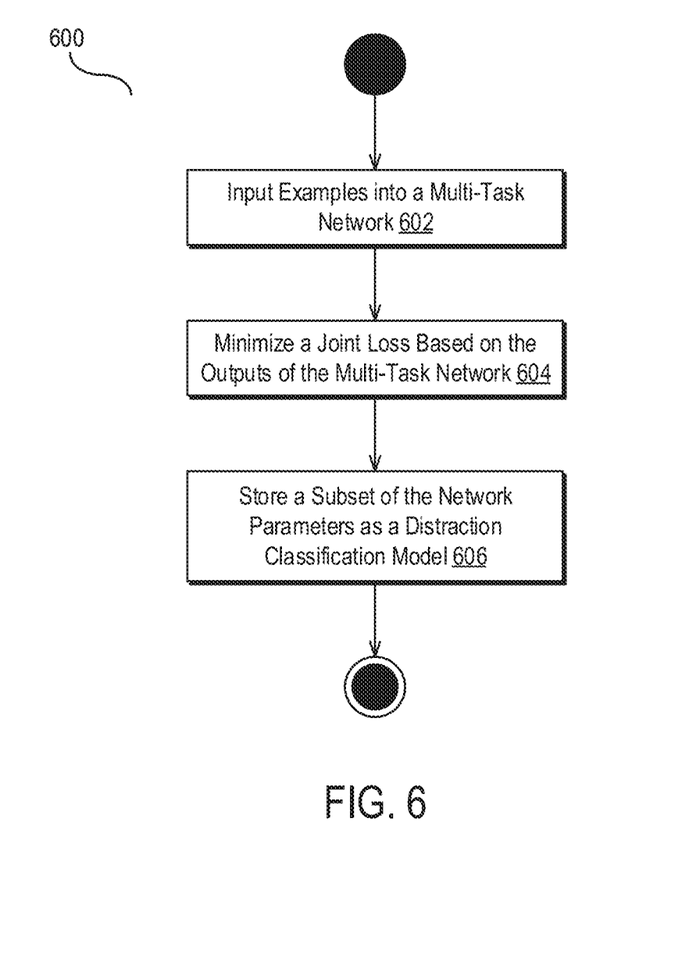
FIG. 6 is a flow diagram illustrating a method for training a distraction classification model according to some embodiments.

FIG. 6 is a flow diagram illustrating a method for training a distraction classification model according to some embodiments.

In block 602, method 600 comprises inputting a plurality of labeled examples into a multi-task network.

In one embodiment, the multi-task network comprises the network 200 previously discussed in connection with FIG. 2. In one embodiment, the multi-task network comprises a backbone network, the backbone network generating one or more feature vectors corresponding to each of the labeled examples, and a plurality of prediction heads coupled to the backbone network.

In one embodiment, the backbone network comprises a CNN and an FPN coupled to the CNN. In one embodiment, the CNN comprises an EfficientNet. Alternatively, or in conjunction with the foregoing, the FPN can comprise a bi-direction FPN. As discussed in FIG. 2, training image data is fed to the CNN, and the output of the CNN is fed to the FPN in some embodiments. In some embodiments, the prediction heads can comprise their own deep learning models (i.e., a CNN or similar network). In some embodiments, the prediction heads receive their input from either the CNN or the FPN.

The number of prediction heads is not limited. In one embodiment, the prediction heads include a distraction classification prediction head (FIG. 5), an object detection prediction head (FIG. 3), and a pose estimation prediction head (FIG. 4). The structures of these prediction heads are described in the corresponding Figures and are not repeated herein. While only three heads are described, other heads may be added as desired. For example, facial landmarks detection, human-body segmentation, and other networks can be added as prediction heads. Indeed, any neural network or machine learning algorithm that can generate an output amenable to joint loss aggregation can be used. Thus, the prediction heads are arbitrarily extendible based on the underlying needs of the classifier.

In block 604, method 600 comprises minimizing a joint loss based on outputs of the plurality of prediction heads, minimizing the joint loss causing a change in parameters of the backbone network.

Each of the prediction heads of the multi-task network outputs a result vector in response to an input vector (i.e., example). In method 600, each example is associated with an expected result vector. Each prediction head can compare the result vector with the expected result vector (i.e., the label) and compute an error vector. Thus, each prediction head can compute at least one loss value. Some prediction heads can compute multiple loss values, as will be discussed.

In one embodiment, a distraction classification prediction head (FIG. 5) can employ a cross-entropy loss function. In some embodiments, the distraction classification head can employ a binary cross-entropy loss function as the loss function. Other loss functions can be used based on the needs of the system. The loss of the distraction classification head is referred to as $loss_{classification}$. In one embodiment, a pose estimation prediction head (FIG. 4) can employ a softmax-based cross-entropy loss function. The loss of the pose estimation prediction head is referred to as $loss_{landmarks}$. In one embodiment, an object detection prediction head (FIG. 3) includes two separate models and two separate outputs. Thus, such a head can employ multiple loss functions. As an example, the object detection prediction head can use a Huber loss function ($loss_{detection}$) to compute the loss for object classification and a focal loss function ($loss_{bbox}$) to generate the loss for bounding box determination. In some embodiments, method 600 can additionally compute an $L_2$ regularization loss also referred to as a least-squares error loss and referred to as $loss_{reg}$. In some embodiments, this $L_2$ regularization loss can be computed across all prediction head outputs. In other embodiments, the $L_2$ regularization loss can be computed across all regression outputs of the prediction heads.

As discussed, the aforementioned losses across all prediction heads can be combined to form a unified/joint loss function:

$$loss = \sum_{i=1}^{n} loss_i$$

where n represents the number of individual loss functions, $loss_i$ represents a given loss function wherein $loss_i=f(x,y)$, x representing the output of the model and y representing the expected output. As discussed examples of $loss_i$ can include $loss_{detection}$, $loss_{bbox}$, $loss_{classification}$, $loss_{landmarks}$, and $loss_{reg}$ among others.

In one embodiment, method 600 employs back-propagation and stochastic gradient descent to adjust individual model parameters. In one embodiment, method 600 uses a stochastic gradient descent algorithm to optimize model parameters based on gradients at each level of the network calculated using back-propagation. In some embodiments, method 600 performs back-propagation throughout the entire network (i.e., from the prediction head output through the backbone network). In other embodiments, method 600 can perform back-propagation only through the backbone network and FPN.

In block 606, method 600 comprises storing a distraction classification model after minimizing the joint loss, the distraction classification model comprising the parameters of the backbone network and parameters of at least one of the prediction heads.

In block 604, method 600 computes parameters across both the backbone network, FPN, and individual prediction heads. In one embodiment, method 600 can store all parameters and thus store the entire network. In another embodiment, however, method 600 can store only the parameters associated with the backbone network and a subset of the prediction heads. In one embodiment, method 600 only stores the backbone network parameters and the distraction classification prediction head (FIG. 5) parameters. In some embodiments, method 600 can segment all of the parameters and thus save all parameters for re-training but segment the backbone network parameters and the distraction classification prediction head (FIG. 5) parameters for testing purposes. Specifically, in some embodiments, only the parameters and thus models for the backbone network and distraction classification prediction head may be transmitted and stored by edge device (e.g., in-vehicle devices) for image classification.

Thus, in the foregoing embodiments, during training, method 600 uses the joint loss across all prediction heads, so that the network could learn distraction classification with the help of auxiliary tasks involving the additional heads. During testing/production, however, the model can be reduced to only a backbone network and distraction classification prediction head. These two models can then be used to perform quick distraction classification on edge devices.

Figure 7:
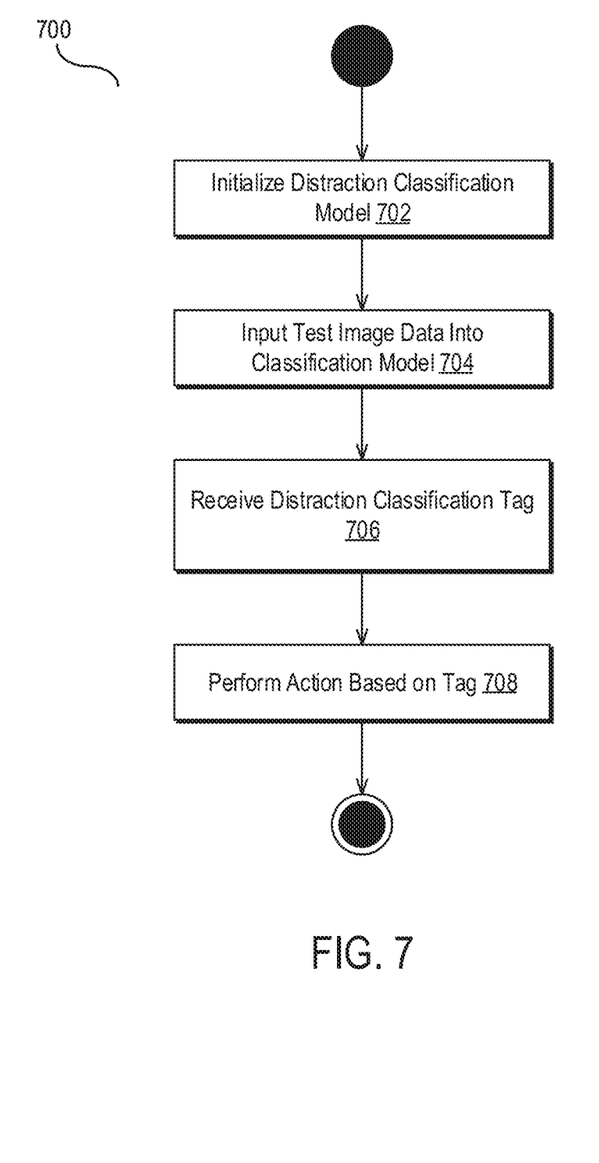
FIG. 7 is a flow diagram illustrating a method for testing a distraction classification model according to some embodiments.

FIG. 7 is a flow diagram illustrating a method for testing a distraction classification model according to some embodiments.

In block 702, method 700 comprises initializing a distraction classification model. In one embodiment, the parameters learned in method 600 are transmitted or otherwise stored in a classification device. In some embodiments, a classification device can comprise a device as that depicted in FIG. 1. In brief, the classification device stores the model parameters and includes logic for loading the model parameters, receiving images, and classifying the images using the model.

In block 704, method 700 comprises inputting image data to the distraction classification model. In an embodiment, method 700 receives images from a camera (still or video) and inputs the images into the distraction classification model. As discussed in FIGS. 2 and 5, the distraction classification model can comprise a backbone network (e.g., CNN) and a distraction classification prediction head. Images are fed into the backbone network, which generates a feature matrix based on the image. The feature matrix is then input to the distraction classification prediction head, which generates a classification of the image.

In block 706, method 700 comprises receiving a distraction classification tag from the distraction classification model. In one embodiment, the distraction classification tag comprises a vector output that indicates the likelihood of a plurality of classes or labels. For example, the distraction classification prediction head can be trained to classify images as undistracted, mobile usage, or other distracted. Of course, other labels can be used during training and these three labels are only provided as examples. In some embodiments, the distraction classification prediction head outputs a vector representing the likelihood (i.e., probability) of the label being appropriate.

In block 708, method 700 comprises performing at least one action based on the distraction classification tag.

Based on the output prediction, method 700 can perform various non-limiting actions based on the prediction. In one embodiment, method 700 can update a display on a device to notify the user of the distraction. In one embodiment, method 700 can play an audible sound (e.g., alarm) to cause the driver to pay attention. Alternatively, or in conjunction with the foregoing, method 700 can transmit the prediction (and, in some embodiments, image frames causing the prediction) to a remote server to enable logging of distractions. In some embodiments, the edge device can cache the predictions/images and transmit the data in bulk when connected to a network.

Figure 8:
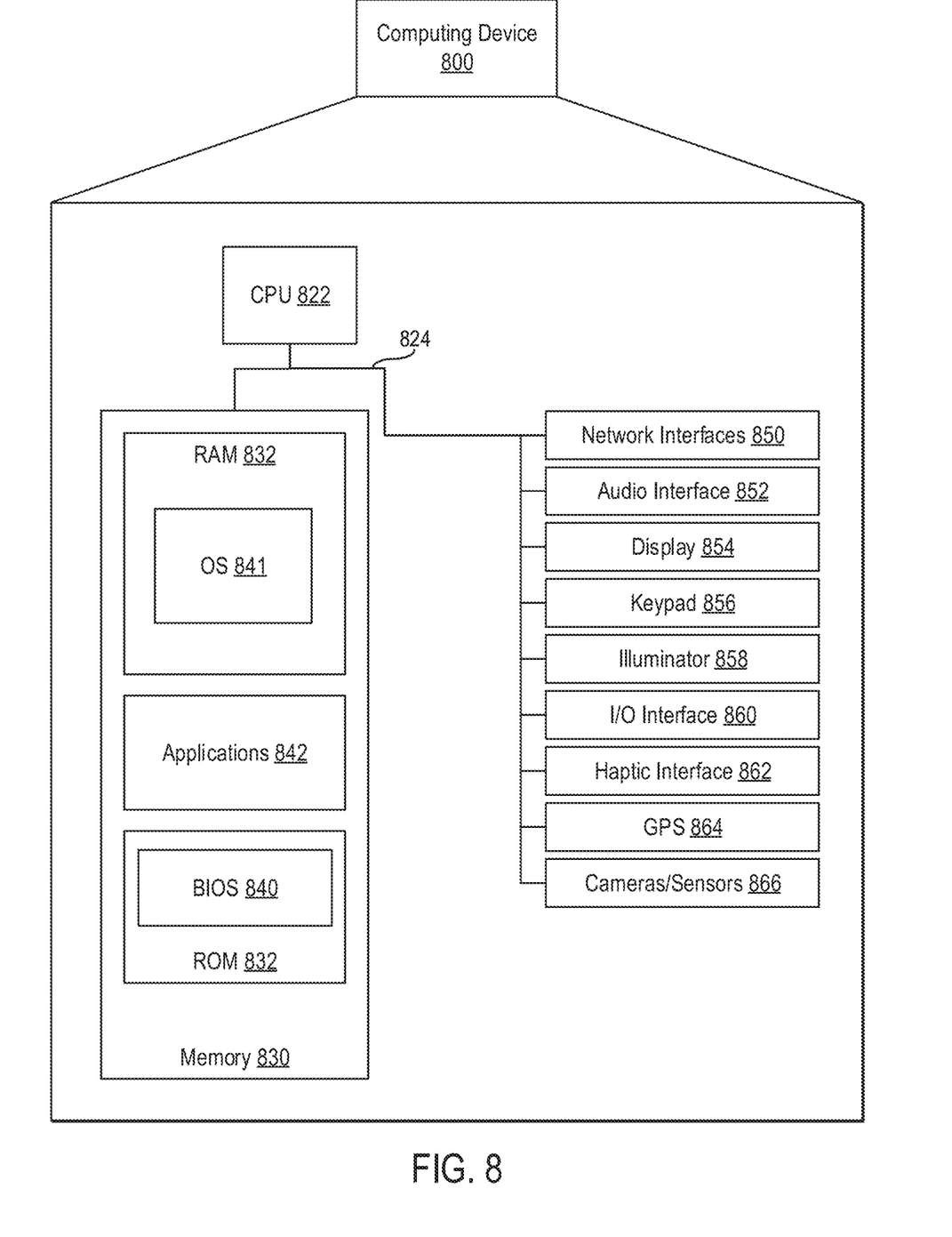
FIG. 8 is a block diagram illustrating a computing device showing an example of a client or server device used in the various embodiments of the disclosure.

FIG. 8 is a block diagram illustrating a computing device showing an example of a client or server device used in the various embodiments of the disclosure.

The computing device (800) may include more or fewer components than those shown in FIG. 8, depending on the deployment or usage of the device (800). For example, a server computing device, such as a rack-mounted server, may not include an audio interface (852), display (854), keypad (856), illuminator (858), haptic interface (862), Global Positioning System (GPS) receiver (864), or cameras/sensor (866). Some devices may include additional components not shown, such as graphics processing unit (GPU) devices, cryptographic co-processors, artificial intelligence (AI) accelerators, or other peripheral devices.

As shown in the figure, the device (800) includes a central processing unit (CPU) (822) in communication with a mass memory (830) via a bus (824). The computing device (800) also includes one or more network interfaces (850), an audio interface (852), a display (854), a keypad (856), an illuminator (858), an input/output interface (860), a haptic interface (862), an optional global positioning systems (GPS) receiver (864) and a camera(s) or other optical, thermal, or electromagnetic sensors (866). Device (800) can include one camera/sensor (866) or a plurality of cameras/sensors (866). The positioning of the camera(s)/sensor(s) (866) on the device (800) can change per device (800) model, per device (800) capabilities, and the like, or some combination thereof.

In some embodiments, the CPU (822) may comprise a general-purpose CPU. The CPU (822) may comprise a single-core or multiple-core CPU. The CPU (822) may comprise a system-on-a-chip (SoC) or a similar embedded system. In some embodiments, a GPU may be used in place of, or in combination with, a CPU (822). Mass memory (830) may comprise a dynamic random-access memory (DRAM) device, a static random-access memory device (SRAM), or a Flash (e.g., NAND Flash) memory device. In some embodiments, mass memory (830) may comprise a combination of such memory types. In one embodiment, the bus (824) may comprise a Peripheral Component Interconnect Express (PCIe) bus. In some embodiments, the bus (824) may comprise multiple busses instead of a single bus.

Mass memory (830) illustrates another example of computer storage media for the storage of information such as computer-readable instructions, data structures, program modules, or other data. Mass memory (830) stores a basic input/output system ("BIOS") (840) for controlling the low-level operation of the computing device (800). The mass memory also stores an operating system (841) for controlling the operation of the computing device (800)

Applications (842) may include computer-executable instructions which, when executed by the computing device (800), perform any of the methods (or portions of the methods) described previously in the description of the preceding Figures. In some embodiments, the software or programs implementing the method embodiments can be read from a hard disk drive (not illustrated) and temporarily stored in RAM (832) by CPU (822). CPU (822) may then read the software or data from RAM (832), process them, and store them in RAM (832) again.

The computing device (800) may optionally communicate with a base station (not shown) or directly with another computing device. Network interface (850) is sometimes known as a transceiver, transceiving device, or network interface card (NIC).

The audio interface (852) produces and receives audio signals such as the sound of a human voice. For example, the audio interface (852) may be coupled to a speaker and microphone (not shown) to enable telecommunication with others or generate an audio acknowledgment for some action. Display (854) may be a liquid crystal display (LCD), gas plasma, light-emitting diode (LED), or any other type of display used with a computing device. Display (854) may also include a touch-sensitive screen arranged to receive input from an object such as a stylus or a digit from a human hand.

Keypad (856) may comprise any input device arranged to receive input from a user. Illuminator (858) may provide a status indication or provide light.

The computing device (800) also comprises an input/output interface (860) for communicating with external devices, using communication technologies, such as USB, infrared, Bluetooth™, or the like. The haptic interface (862) provides tactile feedback to a user of the client device.

The optional GPS receiver (864) can determine the physical coordinates of the computing device (800) on the surface of the Earth, which typically outputs a location as latitude and longitude values. GPS receiver (864) can also employ other geo-positioning mechanisms, including, but not limited to, triangulation, assisted GPS (AGPS), E-OTD, CI, SAI, ETA, BSS, or the like, to further determine the physical location of the computing device (800) on the surface of the Earth. In one embodiment, however, the computing device (800) may communicate through other components, provide other information that may be employed to determine the physical location of the device, including, for example, a MAC address, IP address, or the like.

Figure 9:
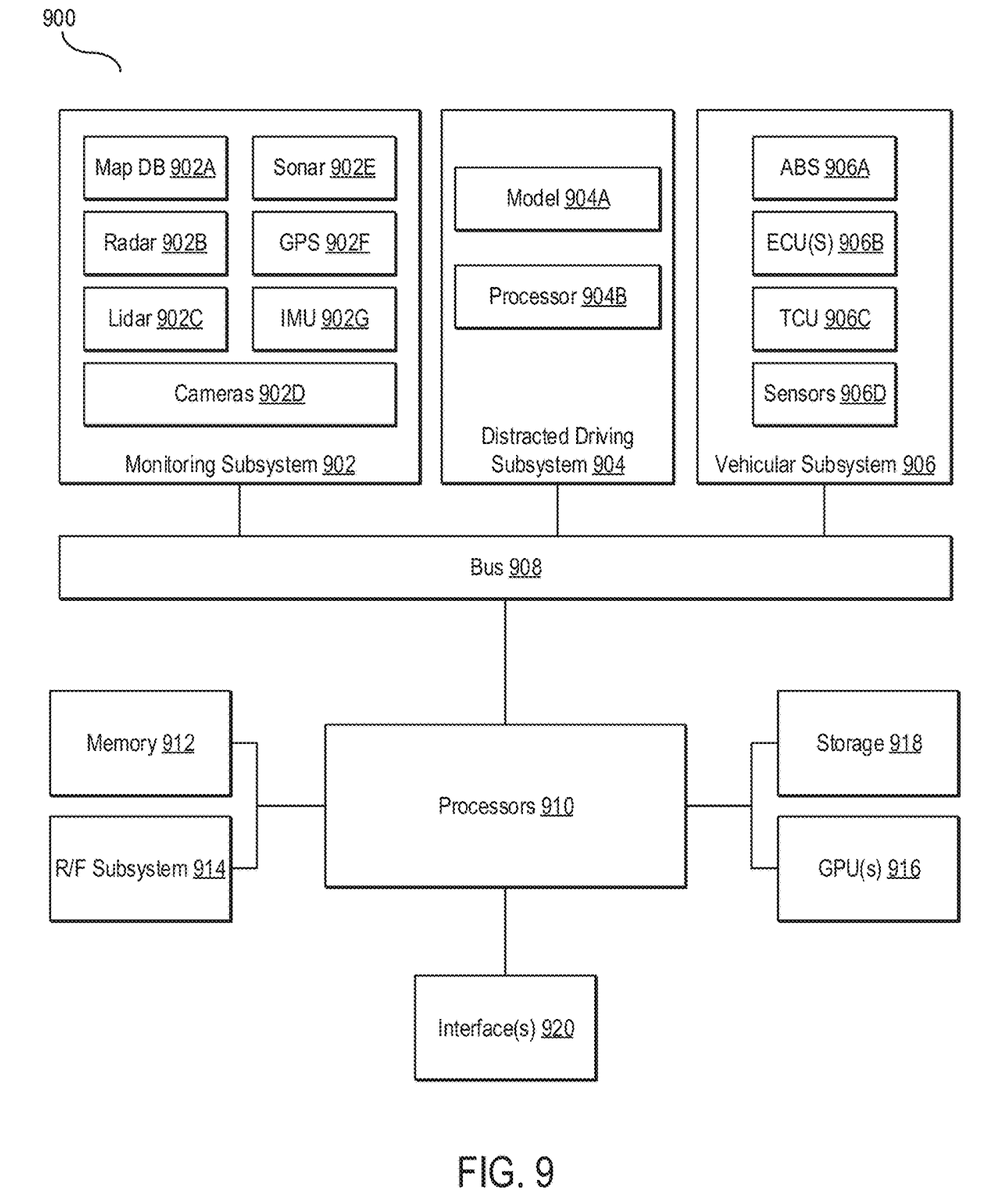
FIG. 9 is a block diagram of a vehicle according to some embodiments of the disclosure.

FIG. 9 is a block diagram of a vehicle according to some embodiments of the disclosure.

The system (900) illustrated in FIG. 9 may be installed entirely within a vehicle. In some embodiments, some components may comprise existing autonomous vehicle subsystems, although, in some embodiments, autonomous vehicle subsystems are optional. Thus, the vehicle in FIG. 9 may comprise either an autonomous, semi-autonomous, or non-autonomous vehicle. Descriptions made herein are primarily described with respect to autonomous vehicles; however, this is not intended to be limiting.

In the illustrated embodiment, the system includes a monitoring subsystem (902). In the illustrated embodiment, the monitoring subsystem (902) includes map database (902*a*), radar devices (902*b*), Lidar devices (902*c*), digital cameras (902*d*), sonar devices (902*e*), global positioning system (GPS) receivers (902*f*), and inertial measurement unit (IMU) devices (902*g*). The components of the monitoring subsystem (902) comprise standard components provided in most current autonomous vehicles or ADAS. In one embodiment, a map database (902*a*) stores a plurality of high-definition three-dimensional maps used for routing and navigation. Radar devices (902*b*), Lidar devices (902*c*), digital cameras (902*d*), sonar devices (902*e*), GPS receivers (902*f*), and inertial measurement units (902*g*) may comprise various respective devices installed at various positions throughout the autonomous vehicle as known in the art. For example, these devices may be installed along the perimeter of an autonomous vehicle to provide location awareness, collision avoidance, and other standard autonomous vehicle or ADAS functionality. As discussed, in some embodiments, the monitoring subsystem (902) may be optional or limited such as any form of an ADAS. For example, a non-autonomous vehicle may only include one camera device, such as a dash-mounted camera device. In this embodiment, the camera may be included in the sensors (906*d*).

The vehicular subsystem (906) is additionally included within the system. The vehicular subsystem (906) includes various anti-lock braking system (ABS) devices (906*a*), engine control unit (ECU) devices (906*b*), transmission control unit (TCU) devices (906*c*), and various other sensors (906*d*) such as heat/humidity sensors, emissions sensors, etc. These components may be utilized to control the operation of the vehicle. In some embodiments, these components perform operations in response to the streaming data generated by the monitoring subsystem (902). The standard autonomous vehicle interactions between the monitoring subsystem (902) and vehicular subsystem (906) are generally known in the art and are not described in detail herein.

The processing side of the system includes one or more processors (910), short-term memory (912), a radio-frequency (RF) system (914), graphics processing units (GPUs) (916), long-term storage (918), and one or more interfaces (920).

One or more processors (910) may comprise central processing units, field-programmable gate arrays (FPGAs), or any range of processing devices needed to support the operations of the autonomous vehicle. Memory (912) comprises dynamic random-access memory (DRAM) or other suitable volatile memory for the temporary storage of data required by processors (910). RF system (914) may comprise a cellular transceiver and/or satellite transceiver. Long-term storage (918) may comprise one or more high-capacity solid-state drives (SSDs). In general, long-term storage (918) may be utilized to store, for example, high-definition maps, routing data, and any other data requiring permanent or semi-permanent storage. GPUs (916) may comprise one or more high throughput GPU/VPU/TPU devices for processing data received from the monitoring subsystem (902). Finally, interfaces (920) may comprise various display units positioned within the autonomous vehicle (e.g., an in-dash screen).

Each of the devices is connected via a bus (908). In one embodiment, the bus (908) may comprise a controller area network (CAN) bus. In some embodiments, other bus types may be used (e.g., a FlexRay or Media Oriented Systems Transport, MOST, bus). Additionally, each subsystem may include one or more additional busses to handle internal subsystem communications (e.g., Local Interconnect Network, LIN, busses for lower bandwidth communications).

The system additionally includes a distracted driving subsystem (904) which performs the operations required by the methods illustrated in the preceding Figures. In the illustrated embodiment, the distracted driving subsystem (904) includes a model (904a) that stores the parameters of the backbone network and classification prediction head as described above. The distracted driving subsystem (904) additionally includes a processor (904b) that executes the model, classifies images, receives distracted driving classification tags, and performs actions on those tags, as previously discussed.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
inputting a plurality of labeled examples into a multi-task network, the multi-task network comprising:

a backbone network comprising a convolutional neural network (CNN) and a feature pyramid network (FPN) coupled to the CNN, the backbone network generating one or more feature vectors corresponding to each of the labeled examples, and a plurality of prediction heads coupled to the backbone network, wherein a subset of the plurality of prediction heads receives input from the CNN and a second subset of the plurality of prediction heads receives input from the FPN;

minimizing a joint loss based on outputs of the plurality of prediction heads, the minimizing the joint loss causing a change in parameters of the backbone network; and storing a distraction classification model after minimizing the joint loss, the distraction classification model comprising the parameters of the backbone network and parameters of at least one of the prediction heads.

2. The method of claim 1, wherein the CNN comprises an EfficientNet.

3. The method of claim 1, wherein the FPN comprises a bi-directional FPN.

4. The method of claim 1, wherein a subset of the plurality of prediction heads comprises a distraction classification prediction head, the distraction classification head comprising a convolutional layer, pooling layer, and fully connected layer.

5. The method of claim 1, wherein a second subset of the plurality of prediction heads includes one or more of an object detection prediction head and a pose estimation prediction head.

6. The method of claim 5, wherein the object detection prediction head comprises a bounding box regression network and an object class prediction network, each of the bounding box regression network and the object class prediction network comprising deep neural networks having a plurality of hidden layers, each hidden layer in the hidden layers comprising a convolutional layer, a batch normalization layer, and a batch activation layer, wherein the bounding box regression network outputs coordinates of a bounding box enclosing a detected object and the object class prediction network outputs a class corresponding to the detected object.

7. The method of claim 5, wherein the pose estimation prediction head comprises a deep neural network, the deep neural network comprising a plurality of hidden layers and an output layer, each of the hidden layers comprising a convolutional layer, a batch normalization layer, and an activation layer, and the output layer comprising a convolutional layer.

8. The method of claim 1, wherein storing a distraction classification model after minimizing the joint loss comprises storing parameters of the CNN and at least one of the prediction heads.

9. A non-transitory computer-readable storage medium for tangibly storing computer program instructions capable of being executed by a computer processor, the computer program instructions defining operations of:

inputting a plurality of labeled examples into a multi-task network, the multi-task network comprising:

a backbone network comprising a convolutional neural network (CNN) and a feature pyramid network (FPN) coupled to the CNN, the backbone network generating one or more feature vectors corresponding to each of the labeled examples, and a plurality of prediction heads coupled to the backbone network, wherein a subset of the plurality of prediction heads receives input from the CNN and a second subset of the plurality of prediction heads receives input from the FPN;

minimizing a joint loss based on outputs of the plurality of prediction heads, the minimizing the joint loss causing a change in parameters of the backbone network; and storing a distraction classification model after minimizing the joint loss, the distraction classification model comprising the parameters of the backbone network and parameters of at least one of the prediction heads.

10. The non-transitory computer-readable storage medium of claim 9, wherein the CNN comprises an EfficientNet.

11. The non-transitory computer-readable storage medium of claim 9, wherein the FPN comprises a bi-directional FPN.

12. The non-transitory computer-readable storage medium of claim 9, wherein a subset of the plurality of prediction heads comprises a distraction classification prediction head, the distraction classification head comprising a convolutional layer, pooling layer, and fully connected layer.

13. The non-transitory computer-readable storage medium of claim 9, wherein a second subset of the plurality of prediction heads includes one or more of an object detection prediction head and a pose estimation prediction head.

14. The non-transitory computer-readable storage medium of claim 9, wherein storing a distraction classification model after minimizing the joint loss comprises storing parameters of the CNN and at least one of the prediction heads.

15. A device comprising:

a processor configured to:

input a plurality of labeled examples into a multi-task network, the multi-task network comprising: a backbone network comprising a convolutional neural network (CNN) and a feature pyramid network (FPN) coupled to the CNN, the backbone network generating one or more feature vectors corresponding to each of the labeled examples, and a plurality of prediction heads coupled to the backbone network, wherein a subset of the plurality of prediction heads receives input from the CNN and a second subset of the plurality of prediction heads receives input from the FPN, minimize a joint loss based on outputs of the plurality of prediction heads, the minimizing the joint loss causing a change in parameters of the backbone network, and store a distraction classification model after minimizing the joint loss, the distraction classification model comprising the parameters of the backbone network and parameters of at least one of the prediction heads.

16. The device of claim 15, wherein storing a distraction classification model after minimizing the joint loss comprises storing parameters of the backbone network and at least one of the prediction heads.

17. The device of claim 15, wherein the CNN comprises an EfficientNet.

18. The device of claim 15, wherein the FPN comprises a bi-directional FPN.

19. The device of claim 15, wherein a subset of the plurality of prediction heads comprises a distraction classification prediction head, the distraction classification head comprising a convolutional layer, pooling layer, and fully connected layer.

20. The device of claim 15, wherein a second subset of the plurality of prediction heads includes one or more of an object detection prediction head and a pose estimation prediction head.

* * * * *